Jan. 23, 1968   G. R. KERN, JR   3,364,576
DENTAL HAND PIECE AND HIGH-SPEED TURBINE ASSEMBLY
Filed Sept. 25, 1957   4 Sheets-Sheet 1
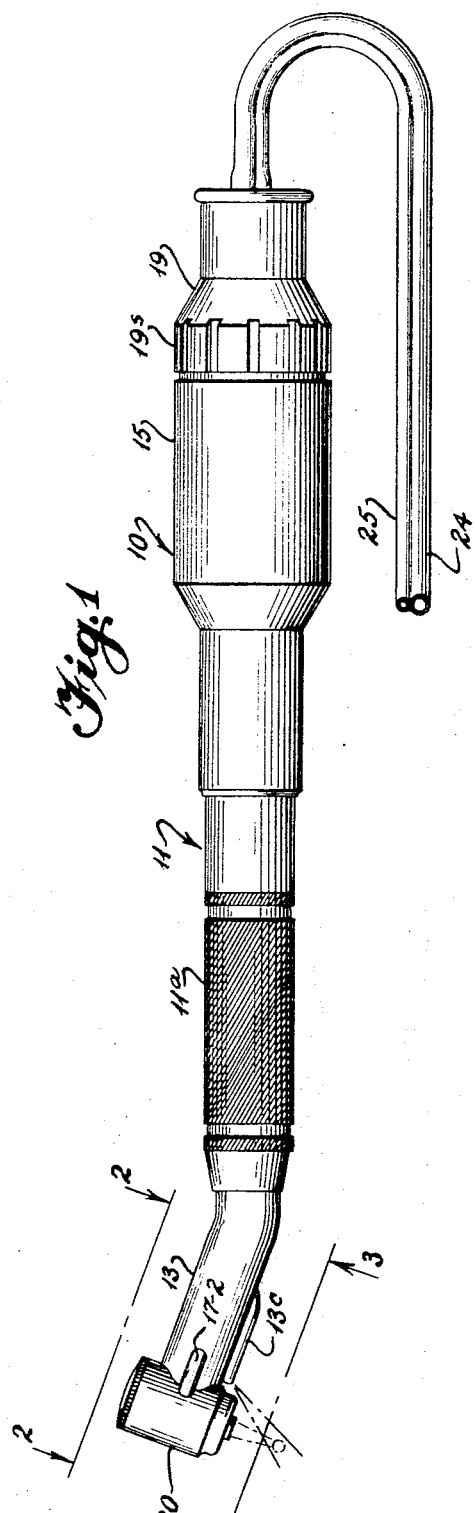
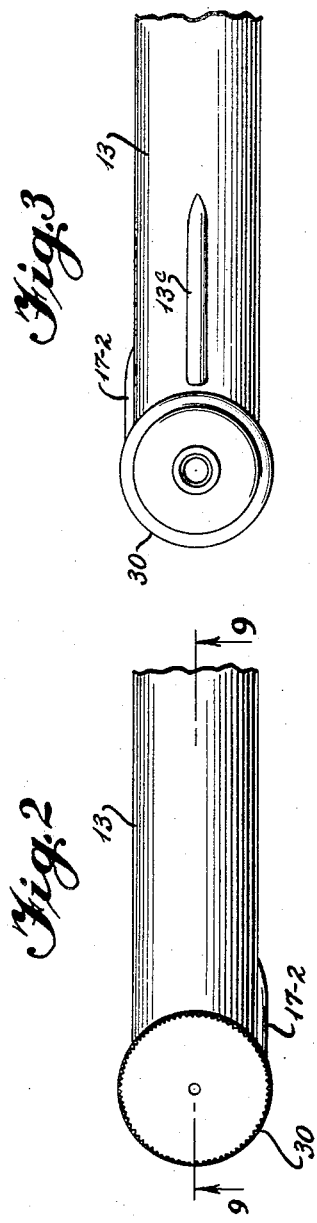
INVENTOR
BY George R. Kern Jr.
Beale and Jones
ATTORNEYS

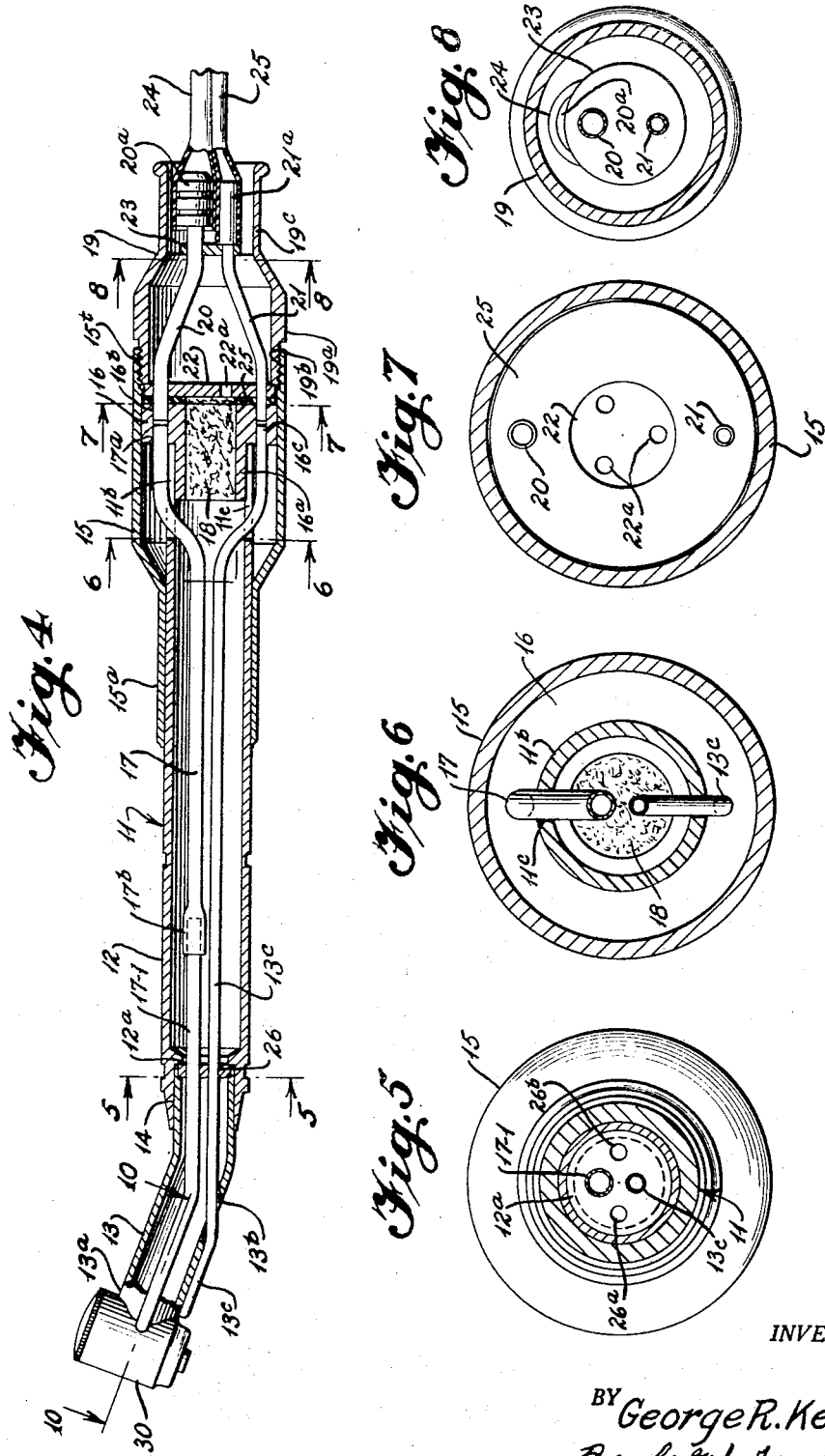

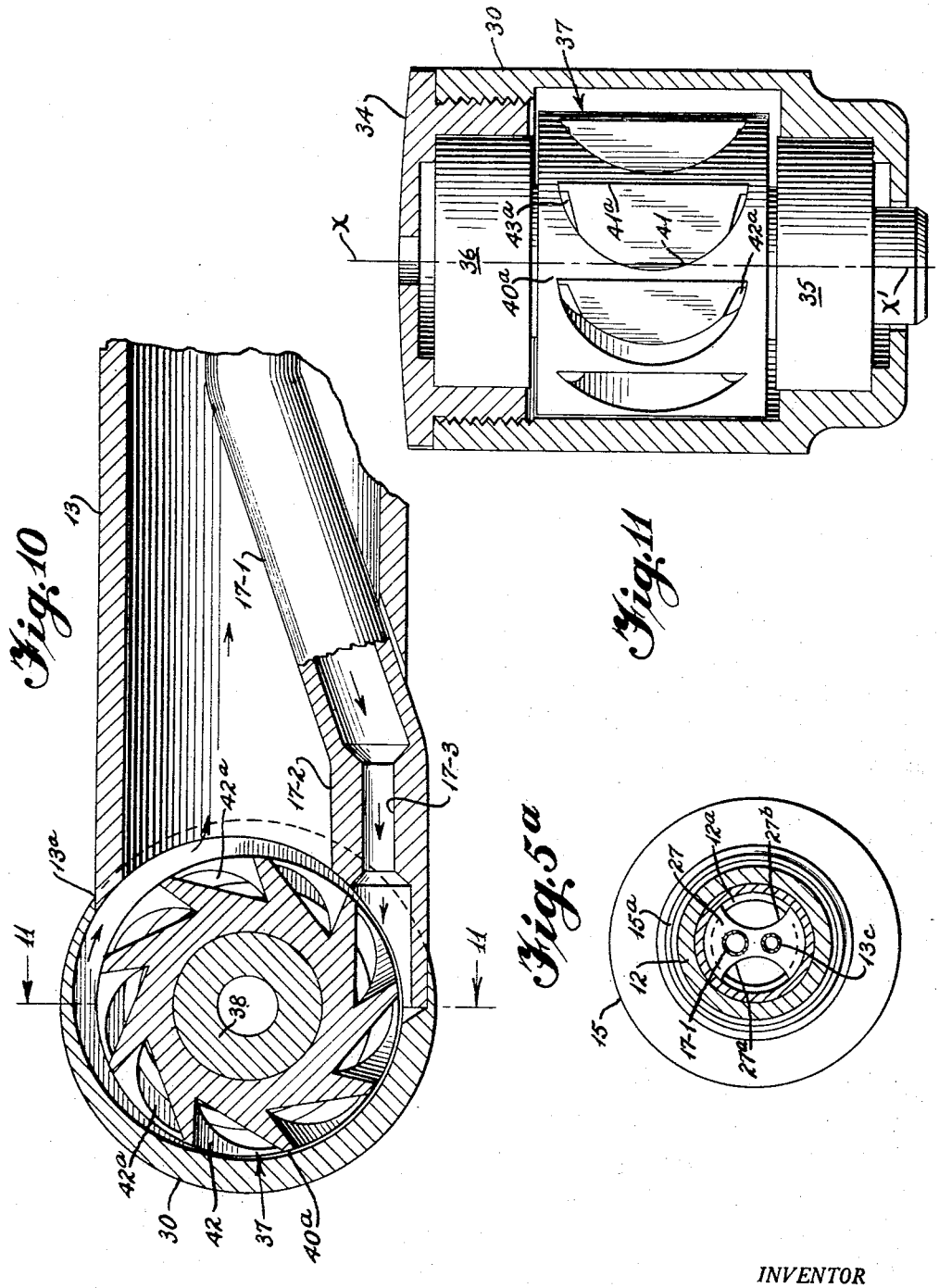

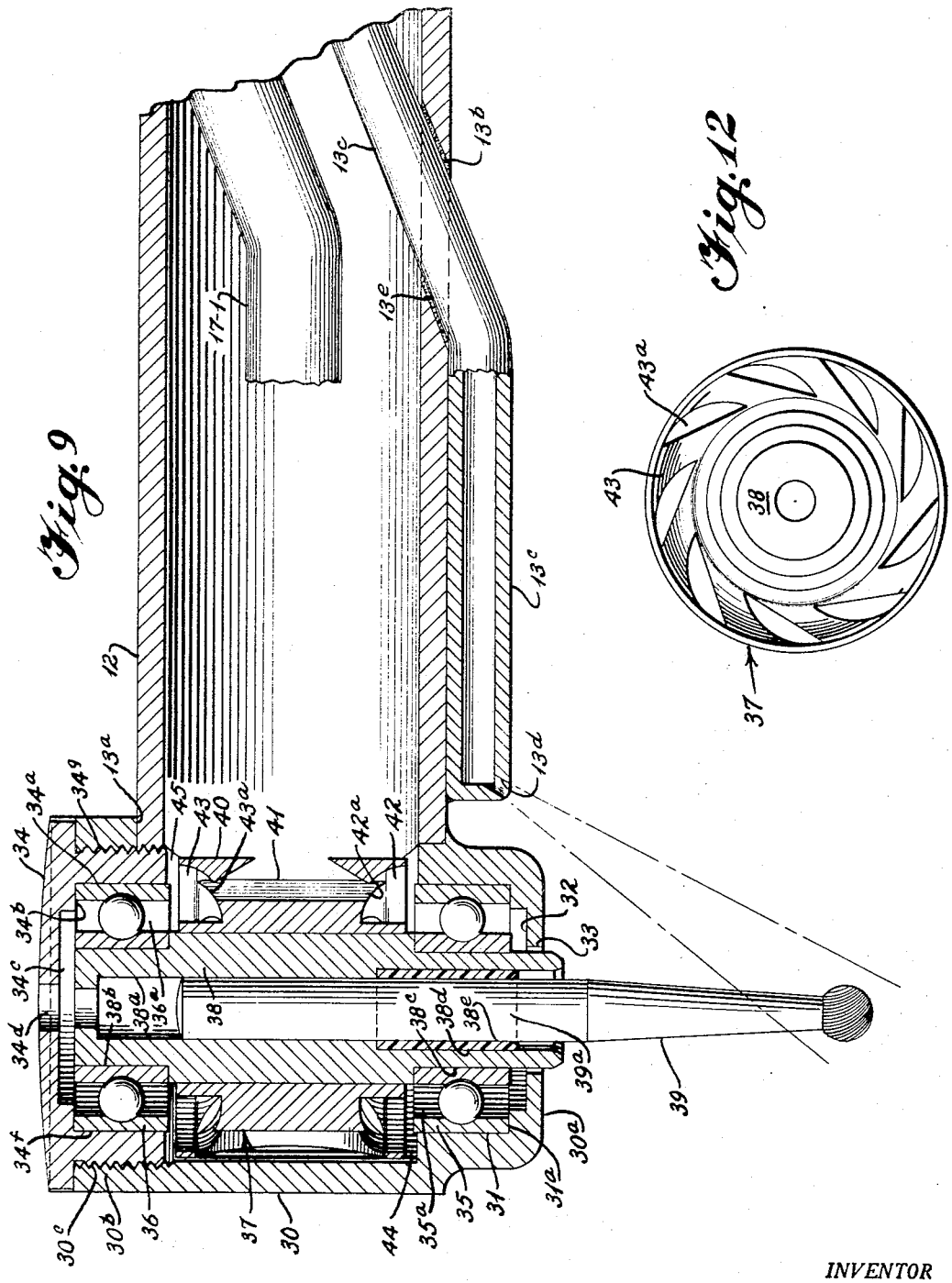

United States Patent Office 3,364,576
Patented Jan. 23, 1968

3,364,576
DENTAL HAND PIECE AND HIGH-SPEED
TURBINE ASSEMBLY
George R. Kern, Jr., Arlington, Va., assignor, by mesne assignments, to Hanau Engineering Company, Inc., a corporation of New York
Filed Sept. 25, 1957, Ser. No. 686,298
16 Claims. (Cl. 32—27)

This invention is directed to a dental hand piece having a high-speed compressed fluid driven turbine at the outer end thereof, with fluid supply, fluid exhaust, and a water supply carried through the dental hand piece.

An object of the invention is to provide a light-weight dental hand piece of the contra-angle type with a high-speed fluid presure driven turbine at the end thereof which is capable of rotating in the order of 200,000 r.p.m., is light in weight and not bulky, has bearings which are properly lubricated to provide long life and yet provides the correct torque for driving dental drill elements.

A further object of the invention is to provide in the high-speed air driven dental hand piece turbine quick detachable coupling means at the inner end of the hand piece for coupling high pressure air and water supply and permitting exhausting of exhaust air from the turbine.

A still further object of the invention is to provide in a dental hand piece a tubular main body with connecting means at the inner end for air and water supply and conduit means therethrough to supply water adjacent the outer end of the hand piece and compressed air to a high-speed turbine positioned transversely at the end of the hand piece wherein the compressed air supply is directed adjacent the outer portion of the turbine to impinge on a rotor and the blades thereof contained within the turbine with said turbine rotor being mounted in antifriction bearing means within the ends of the turbine casing, and supplied with lubricant carried by the compressed air.

A further object of the invention is to provide in a dental hand piece a high-speed turbine for driving a dental drill element wherein the turbine is lubricated by oil carried by the compressed air with exhaust means at each end of the turbine and in the main body of the hand piece to exhaust in a posterior direction therethrough.

A still further object of the invention is to provide in a dental hand piece a fluid drive turbine of miniature proportions which has a rotor with buckets positioned thereabout and with condensing means associated with the rotor which condenses into globules of proper size vaporized lubricating oil carried by the compressed drive fluid, said condensed oil vapor particles having physical properties that afford them a better wetting characteristic than the vaporized oil so that they properly lubricate the rotor bearings there adjacent to the rotor to provide quiet operation and long life to the miniature bearings and turbine.

Still further objects and the entire scope of applicability of the present invention will become apparent from the detailed description given hereinafter. It should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of the invention, reference may be had to the drawings in which:

FIG. 1 is a side elevational view of the dental hand piece showing air and water conduit and coupling attached thereto;

FIG. 2 is an enlarged view of the outer end of the dental hand piece showing the turbine and tubular body along section line 2—2 of FIG. 1;

FIG. 3 is an enlarged view looking at the underneath side of the dental hand piece at the outer end and viewing the turbine at its lower end along line 3—3 of FIG. 1;

FIG. 4 is a vertical cross-sectional view of the dental hand piece shown in FIG. 1 except for the transversely extending turbine at the outer end thereof;

FIG. 5 is a cross-sectional view on an enlarged scale along line 5—5 of FIG. 4 showing a combined restrictor plate and support for air and water conduits;

FIG. 5a is a modified restrictor and support plate for the tubular air and water conduits;

FIG. 6 is a cross-sectional view on an enlarged scale along line 6—6 of FIG. 4 showing the enlarged housing at the posterior end of the tubular main body of the dental hand piece and the mounting of the posterior ends of the water and air conduits;

FIG. 7 is a cross-sectional view along line 7—7 of FIG. 4 on an enlarged scale showing the coupling of the air and water conduits and exhaust apertures;

FIG. 8 is a cross-sectional view on an enlarged scale along line 8—8 of FIG. 4 showing a mounting plate for the air and water conduits at the rear of the coupling assembly;

FIG. 9 is a cross-sectional view on an enlarged scale showing the mounting of the high-speed turbine and casing on the outer end of the tubular main body of the dental hand piece and the arrangement of the high-speed turbine as viewed along line 9—9 of FIG. 2;

FIG. 10 is a cross-sectional view on an enlarged scale of the dental hand piece at the outer end thereof showing the mounting of the high-speed turbine with its rotor as viewed along line 10—10 of FIG. 4;

FIG. 11 is a vertical cross-sectional view through the turbine casing showing the bearings of rotor mounting in full as viewed along line 11—11 of FIG. 10; and FIG. 12 is an end view of the rotor and hub of the turbine showing the annular recess in an end and the apertures or passageways therein communicating with the bucket portions of the rotor.

Throughout the description and the various figures of the drawings, like reference numerals refer to similar parts.

The dental hand piece assembly is generally indicated at 10 and is here shown as the contra-angle type having a tubular main body 11 which is provided with outer surface knurling 11a for grasp by the dentist's fingers. The tubular main body 11 is shown made up in FIG. 4 of a central tubular portion 12 receiving a contra-angle tubular portion 13 at the outer end thereof that is secured thereto in a slip-fit which is soldered at 14 and is adapted at its outer end 13a to be attached to, see FIG. 10, an opening in the turbine 30 to serve as an exhaust passage.

The posterior end of the tubular main body 11 receives a tubular sleeve enlarged housing 15 as at 15a by a slip-fit which may be soldered thereto. The posterior end 11b of the tubular main body has two diametrically positioned slots 11c extending therein to receive conduits as will be explained.

Mounted in the rear end of the enlarged housing 15 is a conduit housing block 16 which has a tubular portion 16a extending forwardly that receives the posterior end of the central tubular portion 12. The housing block 16 as shown in FIG. 6 is formed with apertures 16b and 16c in which there is mounted the air and water conduits to be described.

The high-pressure air conduit 17 is secured at its rear end 17a in the aperture 16b of the housing block and is connected by a slip-fit at 17b where it is extended to the forwardly extending high-pressure conduit section 17-1 which is shown in FIG. 10 terminating in a nozzle portion 17-2 that extends tangentially adjacent the casing turbine 30 and is formed with a narrow throat or nozzle portion 17-3. Also extending within the tubular housing 11 is a water conduit 13c secured at its rear end in the aperture 16c of housing block 16 while the outer end extends at 13b and terminates by extending along the outer side of the underneath portion of housing 13 as at 13c where it has a nozzle or orifice 13d to provide a water spray onto the drill element as shown in FIG. 9. The tubular conduit 13c where it passes through aperture 13b is secured as by soldering 13e. Each of the conduits 17 and 13c extend in bent shape outwardly as in FIGS. 4 and 6 through the slots 11c. A capsule type of absorbent or filter pad is received in the core of the housing block 16 and intercepts and filters out from the exhaust air passing posteriorly therethrough any oil mist or condensed oil particles carried by the air for lubrication purposes of the turbine bearings. The coupling at the posterior end of the dental hand piece will now be described.

Reference to FIG. 4 shows that the enlarged housing 15 has a threaded interior rear end portion 15t which receives in threaded engagement a coupling cap 19 which is threaded at its enlarged portion 19a as at 19b to be received within the threads 15t. Coupling conduits 20 and 21 for air and water respectively are mounted in the mounting plate 22 as by soldering and extend forwardly thereof to be received within the apertures 16b and 16c in the housing block. Each of these coupling conduits 20 and 21 are bent towards each other and extend parallel within a circular mounting plate 23 where the high-pressure air coupling conduit 20 terminates in a fitting 20a to frictionally receive a one-eighth inch inside diameter flexible plastic tubing 24 while the rear end of coupling tube 21 of the water line has a sleeve secured thereto as at 21a to receive a one-sixteenth inch inside diameter plastic tubing 25 that is bonded to the high-pressure tubing 24 as shown in FIG. 4 and also in FIG. 1. After these tubings are slipped over their respective couplings, the couplings are squeezed together to form a tight friction fit within the cap 19 whose rear portion 19a is in spaced relation about the high-pressure air and water leads so as to provide an exhaust passage means. Plate 22 has exhaust apertures 22a extending therethrough so as to pass the exhaust air which has been filtered by the filter 18 onto the exhausting passage in the cap 19c. The coupling cap 19 has spaced apart longitudinal notches 19s therein as shown in FIG. 1, to provide a finger grasp portion for coupling it to the enlarged housing portion 15. A rubber gasket 25 is inserted over the protecting ends of coupling conduits 20 and 21 where they extend forwardly so as to be received within the apertures 16b and 16c of the housing block. This coupling may be easily disconnected to remove the high-pressure air in the water leads if it is desired to change the contra-angle carrying the high-speed turbine.

Referring back to FIG. 4 at the outer end thereof, and particularly to central tubular portion 12 which has the inner forward portion or outer end portion provided with an inwardly disposed annular flange 12a against which is seated a mounting and restrictor plate 26 and is provided with exhaust vent apertures 26a and 26b. This construction, in some cases, may be necessary to build up the back pressure of the exhaust gas in the turbine. The exhaust gas passes posteriorly through these apertures or into the tubular central portion 12 thence posteriorly through the filter medium 18 and the apertures 22a and thereafter out through the coupling cap 19 at the posterior end thereof about the couplings 20 and 21.

In FIG. 5a, a modified form of restrictor plate is indicated at 27 and it mounts the high-pressure air conduit 17-1 and the water supply conduit 18 therein, and is supported by the flange 12a and is provided with arcuate cutout passages 27a and 27b therein. In this form the modified restrictor plate is more of a support and larger apertures as at 27a and 27b are afforded for posterior passage of the exhaust air from the turbine 30.

In dental hand pieces of this type which have a turbine drive there is always the problem of making such a small turbine adequately small yet strong and durable to withstand repeated usage so as to afford adequate as well as relative economical performance. In the turbine according to this invention these factors have been obtained.

Built into the hand piece and cooperating therewith is the turbine 30 having its outer end 30a of its tubular casing or shell apertured at 33 while the upper end 30b is apertured at 30c to receive a rotor 37 and internally threaded to receive a cap 34. The lower end 30a of the turbine has a cylindrical bore 31 therein to receive a bearing race 35 that rides against a transverse shoulder 31a. Opening into the bore 31 is a smaller recess 32 serving as a communication between bore 31 and lower end aperture 33 through which passes the chuck portion of the rotor.

The closure cap 34 is formed with a recess or bore 34a in a flange 34f in which is received the upper anti-friction bearing member 36 that rests on a shoulder or seat 36b. A secondary cap recess 34c of smaller size than recess 34a serves as a communication between bore 34a and a vent or exhaust aperture 34d in the center of the cap. Cap 34 has its flange 34f externally threaded at 34g so as to be received in the internal threads 30c of the turbine upper end.

The upper bearing assembly 36 in the form of a ball bearing assembly is received in recess or bore 34a of cap 34 and a passage 36a is provided in the assembly for passage of lubricating oil onto recess 34c and exhaust aperture 34d. In the lower end bore 31 is received the lower bearing assembly 35 having a passage 35a therethrough that communicates with recess 32 for passage of lubricating oil.

A rotor member generally indicated at 37 is received in the shell of turbine 30. The rotor 37 has a hub 38 for the rotor and is provided with an elongated axially disposed aperture 38a, an upper reduced journal 38b received in upper bearing assembly 36, and a lower reduced journal 38c received in lower bearing assembly 35. Also in the hub 38 is a chuck recess 38d at the lower end which is undercut to receive a composition lining 38e such as of "Neophrene." A burr or typical stone 39 has its shank 39a received in the bore 38a and is held tightly but removably by the composition lining 38e. The lower journal 38c extends out slightly beyond the lower end 30a of the turbine and in spaced relationship to the encircling apertured end 33 so as to permit exhaust of air therethrough.

The rotor has an annular body 40 received on the hub 38 and it has a peripheral surface 40a. This annular body 40 is of such a length that it is shorter than the spacing between bearing assemblies 35 and 36 and thus leaves a clearance or passageway 44 at the lower end and a clearance or passageway 45 at the upper end. Annular body 40 is formed with nine buckets 41 in spaced relation in the periphery 40a thereof. These are cut in as shown in FIG. 11 as arcuate segments having a chord 41a lying in the periphery 40a and parallel to the axis through the aperture 38a of the hub. In FIG. 9 it will be noted that an annular groove 42a is cut in the lower end 42 of the annular body 40 while an annular groove 43 is cut in the upper end. These grooves are so cut into the ends that passageways 42a at the lower end and 43a at the upper end are formed in the annular member to provide condensing apertures for the vaporized oil in the air that hits the buckets 41. These so formed apertures in cooperation with the buckets 41 have an action on the vaporized oil in the air that results in its change of direction and physical state wherein the vaporized oil particles are condensed into larger particles which have an admirable wetting effect and pass with exhaust air through the end passages to the bearing assemblies. Here in the bearing assemblies the particles of so-called condensed oil having improved wetting characteristics over the vaporized oil cling to the bearing assembly surfaces and admirably lubricate the bearings to provide quiet, vibration free action and long life. The condensed oil tends to separate out from the air and the air exhausts respectively at each end by apertures 33 and 34d.

In FIG. 10 it will be noted that the shell of turbine 30 is eccentric as respects the rotor and the expanding high pressure air entering at 17-2 and expands and exhausts in the increasing crescent shape space in cross-section as shown at the top of FIG. 10 between rotor 37 and casing of turbine until it exhausts in a posterior direction in the tubular hand piece.

The action of the annular member 40 with the buckets 41 and peculiar shaped passages 42a and 43a at the ends thereof on the vaporized oil is to condense the oil and improve its wetting characteristics so that it is trapped in the bearing assemblies to lubricate same. The bearing assemblies also serve the apparent function of filtering out this condensed oil from the exhausting air. This feature affords a quiet running rotor that is well lubricated at its end bearing suspension to provide long life yet small size for such a high speed turbine providing adequate torque.

Fluid pressure of about 20 to 30 lbs./sq. in pressure is utilized and is supplied through suitable solenoid actuated valves with electrical controls. Lubrication fluid is introduced into the fluid pressure supply by a suitable atomizer. The water coupling is made to the usual office supply and suitable solenoid operated valves and electrical control is provided.

In this type of dental hand piece there has been provided an arrangement that is easily grasped and manipulated by the dentist and which carries pressurized air and a water spray therethrough. A turbine of high speed range is built into the outer end of the hand piece and this admirably drives the burrs and stones in a most quiet manner with the least amount of vibration.

I claim as my invention:

1. A dental hand piece comprising in combination a main tubular body having an outer end and a posterior end, a turbine housing attached to the outer end of the body and in communication therewith, an enlarged relatively rigid housing coupling member attached to the posterior end of the tubular body and in communication therewith, a high pressure air conduit extending through said tubular body and terminating at its posterior end in said housing coupling member, a water supply conduit extending through said tubular body and having spray means at its outer end and terminating at its posterior end in said housing coupling member, detachable coupling means connected to said enlarged housing coupling member and having a high pressure air conduit and a water supply conduit housed rigidly spaced apart therein and connected respectively with the posterior ends of said air and water conduits terminating at their posterior ends in said housing coupling member, vent means leading to said main tubular body and venting adjacent said enlarged housing coupling, an air turbine rotor mounted for rotation in said turbine housing and having a chuck connected therewith for receiving an end of a dental drill element, said high pressure air conduit terminating at its outer end adjacent said turbine rotor to supply high pressure air thereto, said tubular body conducting posteriorly to said vent means for immediate exhausting there adjacent at least a portion of exhaust air from said turbine.

2. A dental hand piece comprising in combination, a main tubular body having an outer end and a posterior end, a turbine housing attached to the outer end of the body and in communication therewith, high pressure air and water conduits extending through said main tubular body from outer end to posterior end, coupling means at the posterior end of said tubular main body and having conduits therein connected with said conduits in the tubular main body to supply air and water, vent means leading to said main tubular body and venting adjacent the posterior end of said main tubular body, an air turbine rotor mounted for rotation in said turbine housing and having a chuck connected therewith for receiving an end of a dental drill element, said rotor having journal means at opposite ends thereof, bearing means in each end of the turbine housing receiving respectively said journal means, said turbine housing having air vent means at each end thereof respectively adjacent said bearing means, said bearing means in each end having vent means therethrough adapted to receive lubricant in the form of mist carried in said high pressure air and pass air outwardly to said vent means in the turbine housing, said turbine rotor being spaced at each end respectively from said bearing means to pass air therethrough to said bearings and having a plurality of spaced apart bucket portions in the circular periphery thereof, said high pressure air conduit terminating at its outer end in a nozzle extending in a tangential line adjacent said turbine rotor to supply to the bucket portions thereof high pressure air having bearing lubricant carried thereby, said turbular body conducting posteriorly to said vent means at least a portion of exhaust air from said turbine for venting by said vent means.

3. A dental hand piece according to claim 2 wherein said turbine rotor has vent passages extending therein from the bucket portions to each end of the rotor at a position in the rotor adjacent each respective bearing means for the rotor whereby air with lubricant passes therethrough to each bearing.

4. A dental hand piece according to claim 2 wherein said bucket portions in the rotor are of a segmental arcuate shape with the chord of the segmental shape lying in the periphery parallel to the axis through the rotor and having the deepest part of the bucket approximately midway the length of the rotor.

5. A dental hand piece according to claim 4 wherein said rotor at each end has an annular recess formed therein and in communication with each end of said buckets of said rotor.

6. A dental hand piece according to claim 5 wherein said recess in each end is of concave shape in cross-section.

7. In a dental hand piece having a tubular main body having an outer and a posterior end thereon, a fluid pressure turbine using fluid having vaporized lubricant carried thereby and having a casing mounted on and in communication with the outer end of said tubular main body and with the axis of the turbine and casing extending transverse to the tubular main body, a lower end on the turbine casing having a recess therein and an aperture leading from the recess and extending through said lower end about said axis, an upper end of the casing opposite to said lower end having an opening to receive a closure cap, a lower bearing assembly mounted in the recess in the lower end and having a passage therethrough in communication with said aperture in the lower end of the casing, a rotor having a lower journaled end and an upper journaled end thereon mounted in the casing with the lower journal received in said lower bearing, said lower journaled end having a recess therein extending axially and chuck means for a dental drill element receivable therein, an upper bearing assembly received over the upper journaled end of the rotor and having a passage therethrough, a closure cap for the upper end of the turbine casing having a recess therein to receive and support said upper bearing assembly and an aperture extending through said cap and in communication with the passage in the upper bearing assembly, said rotor having a plurality of blade portions thereon for receiving fluid pressure impulses to rotate same and fluid condensing means to condense lubricant carried in the fluid as a vapor, said fluid condensing means having passages therethrough permitting fluid leaving the blades to pass at the ends of the rotor to the passageway in each bearing assembly where the condensed lubricant is trapped by the bearing assembly to supply lubrication thereto and the air minus the lubricant passes from the bearing assemblies out respectively through the aperture at the lower end of the casing and the aperture in the closure member of the upper end of the turbine casing and fluid pressure conduit means in the tubular main body having a nozzle outlet at the outer end thereof for directing fluid containing the vaporized lubricant under pressure to said rotor blades.

8. In a dental hand piece according to claim 7 wherein said communication means for fluid at each end of the rotor comprises a passageway formed by spacing the end of said rotor from adjacent bearing assembly and lower end of turbine casing and cap closure.

9. In a dental hand piece according to claim 7 wherein said communication means for fluid at each end of the rotor comprises apertures formed in each end of the rotor adjacent the ends of each blade portion and in alignment therewith to receive and direct a portion of the fluid striking each blade.

10. In a dental hand piece according to claim 7 wherein said rotor comprises a hub having formed thereon journal portions and a recess at the lower end to receive a dental drill element and a blade body annulus received over said hub for rotation therewith and having blade portions formed therein.

11. In a dental hand piece according to claim 10 wherein said blade body annulus at respective ends is positioned in spaced relation to the adjacent bearing assembly and turbine casing lower end and cap closure at the upper end of the turbine thereby forming said communication means at each end of the rotor.

12. In a dental hand piece according to claim 10 wherein said blade body annulus mounted on said hub has formed in each end thereof passageways in communication with blade cavities adjacent the blade portions formed in the rotor to direct fluid to the passageways in each adjacent bearing assembly and thereby form said fluid communication means and condensing means at each end of the rotor.

13. In a dental hand piece according to claim 10 wherein said blade body annulus at respective ends is positioned in spaced relation to the adjacent bearing assembly and turbine casing lower end and cap closure at the upper end of the turbine to conduct fluid to each adjacent bearing assembly and said annulus has formed in each end thereof passageways in communication with blade cavities adjacent the blade portions formed in the rotor to direct air to the passages in each adjacent bearing assembly, thereby forming said air communication means at each end of the rotor.

14. In a dental hand piece according to claim 7 wherein said rotor comprises a hub having formed thereon journal portions and a recess at the lower end to receive a dental drill element and a blade body annulus received over said hub for rotation therewith and having blade portions formed therein, said turbine casing at the portion about said rotor has the inner wall distance thereof from the axis of the rotor gradually increasing from a point approximately ninety degrees from the position of said air supply nozzle thereby forming an exhaust passage of gradual increasing size for the expanding air pressure supplied to said blades and conducting exhaust from said blades to the interior of said tubular main body and directing it toward the posterior end thereof.

15. An instrument having a tubular main body having an outer and a posterior end thereon, a fluid pressure turbine using fluid carrying vaporized lubricant and having a casing mounted on and in communication with the outer end of said tubular main body and with the axis of the turbine and its housing extending transverse to the tubular main body, a lower end on the turbine housing having a recess therein and an aperture leading from the recess and extending through said lower end about said axis, an upper end of the turbine casing opposite to said lower end having an opening to receive a closure cap, a lower bearing assembly mounted in the recess in the lower end and having a passage therethrough in communication with said aperture in the lower end of the turbine casing, a rotor having a lower journaled end and an upper journaled end thereon mounted in the turbine casing with the lower journal received in said lower bearing assembly, said lower journaled end having a recess therein extending axially and chuck means for a drill element received therein, an upper bearing assembly received over the upper journaled end of the rotor and having a passage therethrough, a closure cap for the upper end of the turbine casing having a recess therein to receive and support said upper bearing assembly and an aperture extending through said cap and in communication with the passage in the upper bearing assembly, said rotor having a plurality of blade portions thereon for receiving fluid pressure impulses to rotate same and fluid condensing means to condense lubricant carried in the fluid as a vapor, said fluid condensing means having passages therethrough permitting fluid leaving the blades to pass at the ends of the rotor to the passageway in each bearing assembly where the condensed lubricant is trapped by the bearing assembly to supply lubrication thereto and the air minus the lubricant passes from the bearing assemblies out respectively through the aperture at the lower end of the turbine casing and the aperture in the closure member of the upper end of the turbine casing and fluid pressure conduit means in the tubular main body having a nozzle outlet at the outer end thereof for directing fluid containing the vaporized lubricant under pressure to said rotor blades.

16. An instrument having a tubular main body having an outer and a posterior end thereon, a fluid pressure turbine using fluid carrying vaporized lubricant and having a casing mounted on and in communication with the outer end of said tubular main body and with the axis of the turbine and its casing extending transverse to the tubular main body, a lower end on the turbine casing having a recess extending through said lower end about said axis, an upper end of the turbine casing opposite to said lower end having an opening to receive a closure cap, a lower bearing assembly mounted in the lower end of the turbine casing and having a passage therethrough in communication with said aperture in the lower end of the turbine casing, a rotor having a lower journaled end and an upper journaled end thereon mounted in the turbine casing with the lower journal received in said lower bearing assembly and extending therethrough and through said recessed end of the casing in spaced relation thereto, said lower journaled end having a recess therein extending axially and chuck means for a drill element received therein, an upper bearing assembly received over the upper journaled end of the rotor and within the upper end portion of the turbine casing in spaced relation from the upper end thereof and having a passage therethrough, a closure cap for the upper end of the turbine casing having an aperture extending through said cap and in communication with the passage in the upper bearing assembly, said rotor having a plurality of blade portions thereon for receiving fluid pressure impulses to rotate same and fluid condensing means to condense lubricant carried in the fluid as a vapor, said fluid condensing means having passages therethrough permitting fluid leaving the blades to pass at the ends of the rotor to the passageway in each bearing assembly where the condensed lubricant is trapped by the bearing assembly to supply lubrication thereto and venting occurs through the bearing assemblies and out respectively through the aperture at the lower end of the turbine casing and the aperture in the closure member of the upper end of the turbine casing and fluid pressure conduit means in the tubular main body having a nozzle outlet at the outer end thereof for directing fluid containing the vaporized lubricant under pressure to said rotor blades.

References Cited

UNITED STATES PATENTS 2,180,993  11/1939  Monnier _____ 253—2
2,231,393  2/1941  Mulvany _____ 32—28

FOREIGN PATENTS 163,217  10/1948  Austria.

LOUIS G. MANCENE, *Primary Examiner.*

J. R. KLINE, R. E. MORGAN, R. J. HOFFMAN,
*Assistant Examiners.*